B. W. FJELLMAN.
PROCESS OF AND MEANS FOR GRINDING THE CURVED SUPERFICIES OF CONICAL ROLLERS.
APPLICATION FILED AUG. 12, 1916.
1,298,486.
Patented Mar. 25, 1919.
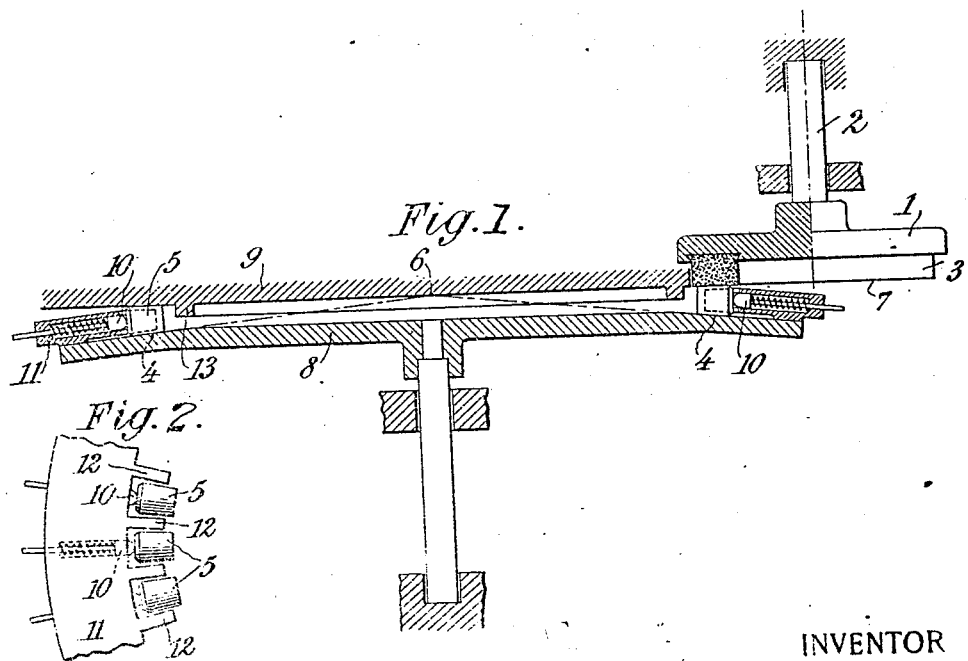

UNITED STATES PATENT OFFICE.

BENGT WIKTOR FJELLMAN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

PROCESS OF AND MEANS FOR GRINDING THE CURVED SUPERFICIES OF CONICAL ROLLERS.

1,298,486.     Specification of Letters Patent.     Patented Mar. 25, 1919.

Application filed August 12, 1916. Serial No. 114,606.

*To all whom it may concern:*

Be it known that I, BENGT WIKTOR FJELLMAN, a subject of the King of Sweden, residing at Gottenborg, in the Kingdom of Sweden, have invented a certain new and useful Process of and Means for Grinding the Curved Superficies of Conical Rollers, of which the following is a specification.

This invention relates to an improved process of and means for grinding the curved superficies of conical rollers, such as those used in roller bearings.

The object of the invention is to secure an accurate and uniform grinding of a large number of rollers at a time.

The process according to the invention consists, chiefly, in working the rollers, while causing same to roll on a conical track, the inclination of which to the working surface of the grinding disk corresponds to the top angle of the rollers to be ground, by a rotary grinding disk having, preferably, a plane working surface. The rolling movement of the rollers can be effected by the grinding disk or by causing the conical track to rotate either in a direction opposite to or in the same direction as the direction of rotation of the grinding disk.

The grinding machine comprises a grinding disk and a device for guiding the rollers to be ground.

In the drawings, a practicable embodiment of a device for carrying out the said grinding process is illustrated, in which drawings Figure 1 is a partial vertical sectional view of the device, and Fig. 2 is a plan view of a detail thereof.

One of the essential features of this invention relates to the individual movement of the rollers in a direction toward the axis of the roller-supporting track during the grinding operation, whereby the apices of the rollers are maintained during the whole grinding operation on the axis of the said track, the rollers being continually adjusted in position on such roller-supporting track during the grinding operation.

The grinding disk 1 is shown carried by a rotary shaft 2. It carries the grinding material, which is shown to form a ring 3 concentric with the shaft 2 and having a plane working surface 7. The guiding device for the rollers 5 consists of an annular track 4, formed on a rotary disk 8. Placed above the said disk is a stationary disk 9 adapted to bear on the rollers. The portion of the stationary disk 9 bearing on the rollers is on a plane with the apex 6 of the conical roller-supporting track 4. The rollers 5 are placed between the track 4 and the disk 9 and are held in position by spring-actuated bolts 10 suitably placed in recesses in a ring 11 attached to the disk 8, outside the rollers, said ring being also suitably provided with projections 12 serving to prevent the rollers from taking up oblique positions and to keep them just opposite the spring-actuated bolts 10. The disk 9 is provided, at one point of its circumference, with a recess in order to make room for the grinding disk 1 the working surface 7 of which is on a plane with the portion of the disk 9 bearing on the rollers.

When the grinding machine is to be used, the roller-supporting track is filled with rollers, whereupon the grinding disk is rotated and lowered until it comes into contact with the rollers, which are then rotated by friction and ground all around. By this rolling movement, the rollers are caused to move on their track so that all the rollers are successively brought into contact with the grinding disk and uniformly ground. If a greater speed of rotation of the rollers than that imparted to them by the movement of the grinding disk solely is preferred, this can be obtained by imparting to the roller-supporting track a rotary motion in a direction opposite to that of the grinding disk. If, on the other hand, a slower rotation but a more rapid feed movement of the rollers is preferred, this can be obtained by causing the roller-supporting track to rotate in the same direction as the grinding disk.

In the illustration, the disk 8 is arranged to rotate in order to cause the rollers to be successively brought under the rotary grinding disk and worked by the same. In order that the rollers shall not be ground and further reduced in diameter, after the desired diameter has been reached, the stationary disk 9 is suitably provided with a shoulder in the form of an annular flange 13 which limits the movement of the rollers toward the center of the disk 8. Obviously, such a flange can as well be arranged on the disk 8. Instead of using a single grinding disk, as shown in the drawing, a plurality of grinding disks can be used in connection with the roller-supporting track.

As is obvious, one grinding disk can be used to coöperate with a plurality of roller-supporting tracks placed side by side.

In using several grinding disks, it is of importance that the working surfaces of the said grinding disks are held, during the grinding operation, in one plane and that the inclination of the roller-supporting tracks to the said plane corresponds to the top angle of the conical rollers to be ground.

I claim as my invention:—

1. The process of grinding the superficies of a plurality of conical rollers at a time, which consists in placing the rollers to be ground on a conical roller-supporting track, applying a rotary grinding disk to the rollers thereon, and during the grinding operation continually moving the rollers in a direction toward their apices.

2. The process of grinding the superficies of a plurality of conical rollers at a time, which consists in placing the rollers to be ground on a conical roller-supporting track, the apices of the angles of the rollers being directed toward the apex of the angle of the said track, applying a grinding element to the said rollers, and continually adjusting the position of the rollers toward the said track apex during the grinding.

3. In a machine for grinding the superficies of conical rollers, the combination of a rotary grinding disk, a rotary roller-supporting cone placed eccentrically in relation to the said grinding disk, the base angle of said roller-supporting cone being equal to the top angle of the rollers to be ground, a stationary disk placed above the said cone, in contact with the rollers to be ground, the portion of the said disk bearing on the rollers being on a plane with the apex of the said cone, said disk being further provided with a recess allowing the rollers to be worked by the grinding disk, and means for individually moving the rollers toward the center of the said roller-supporting cone, substantially as described.

4. In a machine for grinding the superficies of conical rollers, the combination of a rotary grinding disk, a rotary roller-supporting cone placed eccentrically in relation to the said grinding disk, the base angle of said roller-supporting cone being equal to the top angle of the rollers to be ground, a stationary disk placed above the said cone, in contact with the rollers to be ground, the portion of the said disk bearing on the rollers being on a plane with the apex of the said cone, said disk being further provided with a recess allowing the rollers to be worked by the grinding disk, and spring-actuated bolts adapted to press the rollers toward the center of the said roller-supporting cone, substantially as described.

5. In a machine for grinding the superficies of conical rollers, the combination of a rotary grinding disk, a rotary roller-supporting cone placed eccentrically in relation to the said grinding disk, the base angle of said roller-supporting cone being equal to the top angle of the rollers to be ground, a stationary disk placed above the said cone, in contact with the rollers to be ground, the portion of the said disk bearing on the rollers being on a plane with the apex of the said cone, said disk being further provided with a recess allowing the rollers to be worked by the grinding disk, a ring secured to the roller-supporting cone, said ring having projections extending toward the center of the said cone to form pockets for the rollers, and spring-actuated bolts placed in recesses in the said ring and adapted to press on the outer ends of the rollers, substantially as described.

In testimony whereof I affix my signature.

BENGT WIKTOR FJELLMAN.